United States Patent
Sato (10) Patent No.: US 9,477,432 B2
(45) Date of Patent: Oct. 25, 2016

(54) METHOD FOR CONTROLLING COMMUNICATION APPARATUS, AND PROGRAM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/957,105

(22) Filed: Dec. 2, 2015

(65) Prior Publication Data

US 2016/0162224 A1   Jun. 9, 2016

(30) Foreign Application Priority Data

Dec. 4, 2014   (JP) ................................ 2014-246352

(51) Int. Cl.
 *G06F 3/12* (2006.01)
 *H04M 1/725* (2006.01)

(52) U.S. Cl.
 CPC ........... *G06F 3/1218* (2013.01); *G06F 3/1204* (2013.01); *G06F 3/1292* (2013.01); *H04M 1/72533* (2013.01)

(58) Field of Classification Search
 CPC .. G06F 3/1218; G06F 3/1292; G06F 3/1204; H04M 1/72533; H04N 1/00281
 USPC ........................................................ 358/1.15
 See application file for complete search history.

(56) References Cited

U.S. PATENT DOCUMENTS

| 2013/0212261 | A1* | 8/2013 | Fujii | .................. H04N 1/00204 709/224 |
| 2014/0085675 | A1* | 3/2014 | Watanabe | .......... H04N 1/00233 358/1.15 |
| 2014/0171031 | A1* | 6/2014 | Takada | .................. H04W 12/06 455/411 |

FOREIGN PATENT DOCUMENTS

| JP | 2007-221355 A | 8/2007 |
| JP | 5120417 B2 | 1/2013 |
| JP | 2014-192695 A | 10/2014 |

* cited by examiner

*Primary Examiner* — Allen H Nguyen
(74) *Attorney, Agent, or Firm* — Canon USA, Inc., IP Division (57) ABSTRACT

A communication apparatus including a first wireless communication unit that communicates with a partner apparatus by a first wireless communication method, and a second wireless communication unit that communicates with the partner apparatus by a second wireless communication method different from the first wireless communication method, acquires an application identifier from the partner apparatus by the first wireless communication method, executes an application corresponding to the identifier acquired by the identifier acquiring unit, and notifies, using the first wireless communication method, the partner apparatus of network setting information in the second wireless communication method. The communication apparatus communicates with the partner apparatus via a network, the setting information of which has been notified through the notification unit.

9 Claims, 9 Drawing Sheets

METHOD FOR CONTROLLING COMMUNICATION APPARATUS, AND PROGRAM

BACKGROUND

1. Field

Aspects of the present invention generally relate to a communication technique.

2. Description of the Related Art

In the related art, there is known a technique that can use, in a mobile terminal, short range wireless communication such as near field communication (NFC), infrared data association (IrDA), and TransferJet®. In the short range wireless communication, only by an operation of bringing apparatuses closer to each other, data can be transmitted and received between the apparatuses (Japanese Patent Application Laid-Open No. 2007-221355). There is also a technique for handover from such short range wireless communication to a different wireless communication method such as a wireless LAN (IEEE 802.11 series) and Bluetooth®. Here, the handover indicates a switch behavior from communication according to a first communication method, to communication according to a second communication method.

Furthermore, there is a function of, when data including information on an application are received through the NFC, automatically starting the application indicated by the information.

As described above, short range wireless communication, such as NFC, is used for a variety of processing. However, processing achieved between apparatuses of the same kind by using the short range wireless communication is single, and achieving a plurality of types of processing using the short range wireless communication between apparatuses of the same kind has not been considered.

SUMMARY

Aspects of the present invention include achieving a plurality of types of processing using the short range wireless communication.

According to an aspect of the present invention, a communication apparatus includes a first wireless communication unit configured to receive information stored in a memory of a communication partner apparatus by a first wireless communication method that is short range wireless communication, a second wireless communication unit configured to communicate with the communication partner apparatus by a second wireless communication method different from the first wireless communication method, a starting unit configured to start, in a case where application information is included in the information received through the first wireless communication unit, an application indicated by the application information, and a write unit configured to write, in a case where first setting information for connecting to a wireless network by the second wireless communication method is not included in the information received through the first wireless communication unit, second setting information for connecting to the wireless network by the second wireless communication method in the memory of the communication partner apparatus through the first wireless communication unit, wherein in a case where the first setting information is included in the information received through the first wireless communication unit, the second wireless communication unit connects to the wireless network based on the first setting information, and wherein the application started by the starting unit is executed using communication through the second wireless communication unit based on the second setting information written by the write unit, or communication through the second wireless communication unit based on the first setting information.

Further features of the present disclosure will become apparent from the following description of exemplary embodiments with reference to the attached drawings.

DESCRIPTION OF THE EMBODIMENTS

Figure 1:
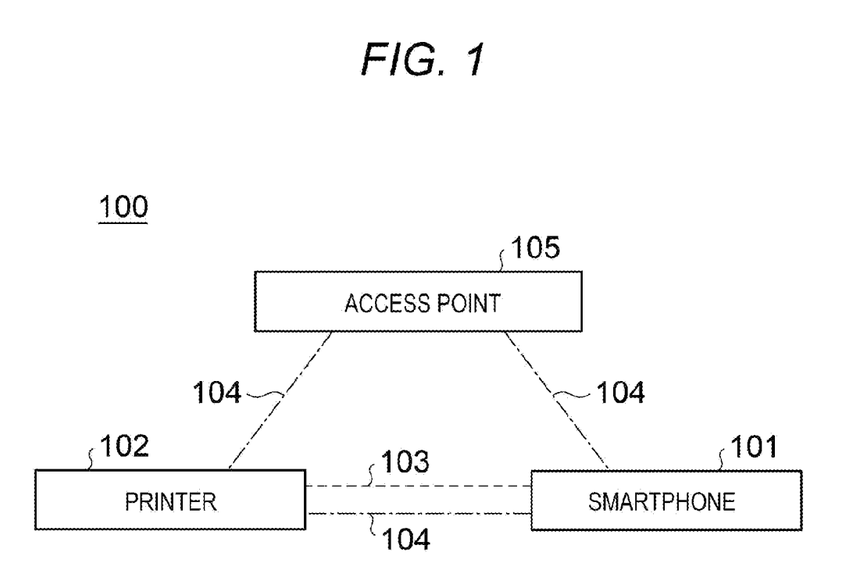
FIG. 1 is a diagram exemplifying a configuration of a communication system.

A communication apparatus and a communication system according to the present embodiment will be described below in detail with reference to the drawings. FIG. 1 is a diagram of a device configuration of a system 100 assumed in the present embodiment which will be described below. A smartphone 101 and a printer 102 are communication apparatuses according to the present embodiment. Apparatuses in the communication system in the present embodiment will be described as a printer and a smartphone, but may be those such as a digital camera, a PC, a video camera, a smart watch, and a PDA.

The smartphone 101 can communicate with the printer 102 using near field communication (NFC) communication 103 which is short range wireless communication. In the present embodiment, the smartphone 101 communicates in a reader writer mode specified by an NFC Forum, while the printer 102 communicates in a card emulation mode specified by the NFC Forum. The reader writer mode is a mode for reading and writing a memory of an apparatus that operates in the card emulation mode. The card emulation mode is a mode for reading and writing a memory from an apparatus that operates in the reader writer mode. The NFC communication 103 between the smartphone 101 and the printer 102 may be bidirectional communication in a P2P mode specified by the NFC Forum. The printer 102 and the smartphone 101 can communicate with each other using wireless LAN communication 104. The printer 102 and the smartphone 101 can also communicate with each other using the wireless LAN communication 104 via an access point (AP) 105.

Figure 2:
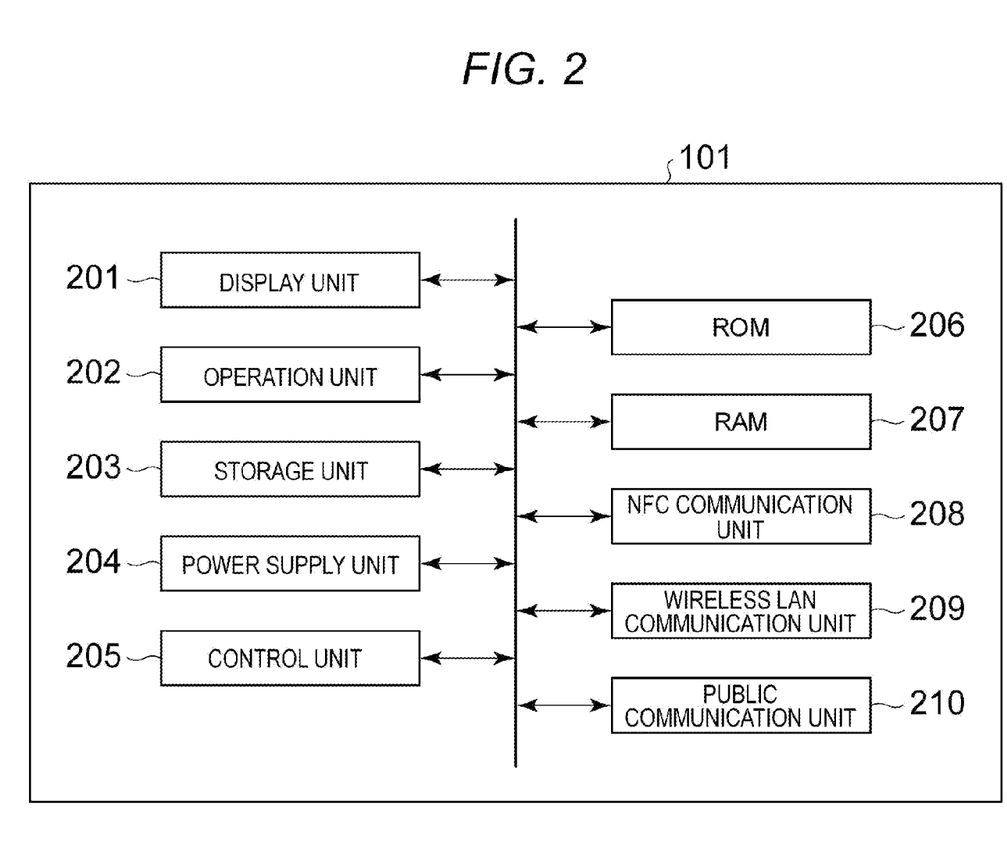
FIG. 2 is a diagram illustrating an exemplary hardware configuration of a smartphone.

Next, FIG. 2 is a diagram illustrating a hardware configuration of the smartphone 101. The smartphone 101 includes a display unit 201, an operation unit 202, a storage unit 203, a power supply unit 204, a control unit 205, a ROM 206, a RAM 207, an NFC communication unit 208, and a wireless LAN communication unit 209.

The display unit 201 includes, for example, an LCD and an LED, has a function of outputting information a user can visually recognize, and displays, for example, a UI related to an application. The operation unit 202 has a function of operating a communication apparatus through various types of inputs and the like by the user. The display unit 201 and the operation unit 202 may be integrally configured by a touch panel, for example.

The storage unit 203 includes a storage medium, for example, an HDD, a flash memory, or a removable SD card, and stores and manages various types of data such as wireless communication network information, transmitted and received data information, image data, and applications. The power supply unit 204 is, for example, a battery, retains power supply for operating the entire apparatus, and supplies power to each hardware.

The control unit 205 is, for example, a central processing unit (CPU) and controls an operation of each component of the smartphone 101. The ROM 206 stores a control command, that is, a program. Each operation which will be described later is realized by executing, by the control unit 205, the control program stored in the ROM 206. The RAM 207 is used as a work memory in executing a program, or for temporarily storing data.

The NFC communication unit 208 carries out the NFC communication 103 in conformity with an NFC standard. The NFC communication unit 208 also automatically establishes the NFC communication 103 when a communicable apparatus is detected within a communication range. In the present embodiment, the NFC communication unit 208 operates as a reader writer and can read out data in an internal memory of an NFC tag unit 308. The NFC communication unit 208 is assumed to carry out wireless communication in conformity with the NFC standard, but may communicate through other short range wireless communication such as infrared communication (IrDA) and TransferJet, or by other wireless communication methods. The NFC communication unit 208 may also use a Bluetooth® Low Energy (BLE) method specified by Bluetooth® 4.0.

The wireless LAN communication unit 209 carries out the wireless LAN communication 104. The wireless LAN communication unit 209 carries out wireless communication in conformity with The Institute of Electrical and Electronics Engineers, Inc. (IEEE) 802.11 series. In the present embodiment, the wireless LAN communication unit 209 is assumed to carry out the wireless communication in conformity with the IEEE 802.11 series, but may use other communication methods such as Bluetooth®.

A public communication unit 210 is connected to a public wireless base station of a mobile network operator and carries out telephone communication or communication for access to the Internet via a public communication network.

Figure 3:
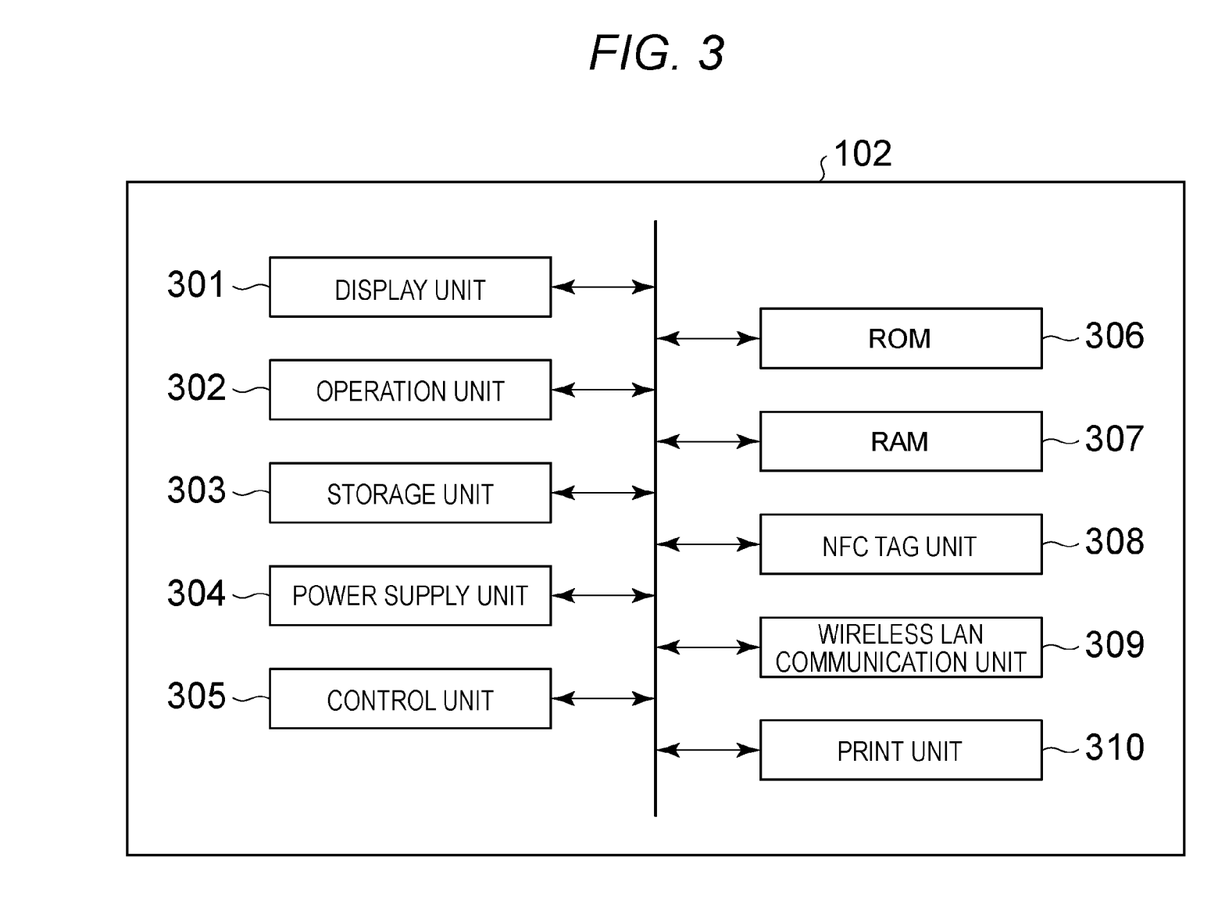
FIG. 3 is a diagram illustrating an exemplary hardware configuration of a printer.

Next, FIG. 3 is a diagram illustrating a hardware configuration of the printer 102.

The printer 102 includes a display unit 301, an operation unit 302, a storage unit 303, a power supply unit 304, a control unit 305, a ROM 306, a RAM 307, the NFC tag unit 308, a wireless LAN communication unit 309, and a print unit 310.

The display unit 301 includes, for example, an LCD and an LED, and has a function of outputting information a user can visually recognize, and displays a variety of UIs. The operation unit 302 has a function of operating a communication apparatus through various types of inputs and the like by the user. The display unit 301 and the operation unit 302 may be integrally configured by a touch panel, for example.

The storage unit 303 includes a storage medium, for example, an HDD, a flash memory, or a removable SD card, and stores and manages various types of data such as wireless communication network information, transmitted and received data information, image data, and applications. The power supply unit 304 is, for example, an alternating current (AC) power supply, acquires power supply for operating the entire apparatus from an outlet, and supplies power to each hardware.

The control unit 305 is, for example, a CPU and controls an operation of the entire printer 102. The ROM 306 stores a control command, that is, a program. Each operation which will be described later is realized by executing, by the control unit 305, the control program stored in the ROM 306. The RAM 307 is used as a work memory in executing a program, or for temporarily storing data.

The NFC tag unit 308 carries out the NFC communication 103. The NFC tag unit 308 has a non-volatile memory inside, and can read and write data stored in the memory from a reader writer through the NFC communication 103. The NFC tag unit 308 carries out wireless communication in conformity with a communication rule specified by the NFC Forum. The memory of the NFC tag unit 308 can rewrite stored information both internally from the control unit 305 and by writing from the reader writer that is an external apparatus. The NFC tag unit 308 also automatically establishes the NFC communication 103 when a communicable apparatus is detected within a communication range, and automatically transmits the information stored in the memory in accordance with a Read command from a communication partner apparatus. The NFC tag unit 308 is assumed to carry out wireless communication in conformity with the NFC standard, but may communicate through other short range wireless communication such as infrared communication (IrDA) and TransferJet, or by other wireless communication methods. The NFC tag unit 308 may also use the BLE method.

Next, functional block diagrams of the smartphone 101 and the printer 102 will be described with reference to FIGS. 4 and 5. In the present embodiment, the functional blocks of the smartphone 101 and the printer 102 are stored respectively as programs in the ROMs 206 and 306, and functions thereof are executed by executing the programs by the control units 205 and 305. In the control units 205 and 305, each function is realized by controlling each hardware, and calculating and processing information in accordance with the control programs. A part or all included in the functional blocks may be implemented by hardware. In this case, a part or all included in each functional block include, for example, an application specific integrated circuit (ASIC).

Figure 4:
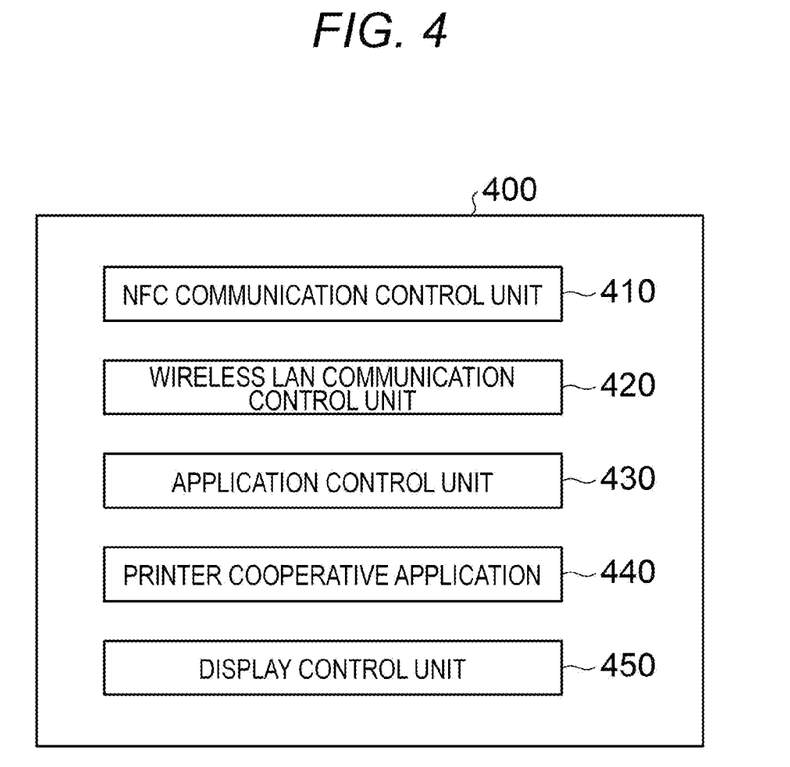
FIG. 4 is a diagram illustrating an exemplary functional block configuration of the smartphone.

FIG. 4 is a functional block diagram (400) of the smartphone 101. The smartphone 101 includes an NFC communication control unit 410, a wireless LAN communication control unit 420, an application control unit 430, a printer cooperative application 440, and a display control unit 450. The NFC communication control unit 410 is a processing unit that controls the NFC communication 103 via the NFC communication unit 208. It is assumed that, in a case where an NFC tag is detected within a range of the NFC communication 103, the NFC communication control unit 410 reads the internal memory of the NFC tag without a user operation. The NFC communication control unit 410 also writes the internal memory of the NFC tag.

The wireless LAN communication control unit 420 is a processing unit that controls the wireless LAN communication via the wireless LAN communication unit 209. In a case where wireless LAN setting information which will be described later is read through the NFC communication 103, the wireless LAN communication control unit 420 also has a function of automatically connecting to a wireless LAN network indicated by the wireless LAN setting information. The wireless LAN communication control unit 420 has an STA function of operating as a station in an infrastructure mode of the wireless LAN and an AP function of operating as an access point.

The application control unit 430 is a control unit that executes an application installed in the storage unit 203 of the smartphone. In a case where application information which will be described later is read through the NFC communication 103, the application control unit 430 also has a function of executing an application corresponding to the application information without a user operation. In a case where the application corresponding to the application information has not been installed, the application control unit 430 has a function of displaying a download site of the application and guiding the user to install. The printer cooperative application 440 is an application that has been installed in the storage unit 203 of the smartphone. The printer cooperative application 440 is an application for cooperative processing with the printer 102 (such as printing instruction and acquisition of status of the printer 102) through communication via the wireless LAN communication 104. The printer cooperative application 440 is an application for printing. The display control unit 450 processes an output to the display unit 201 and an input from the operation unit 202.

Figure 5:
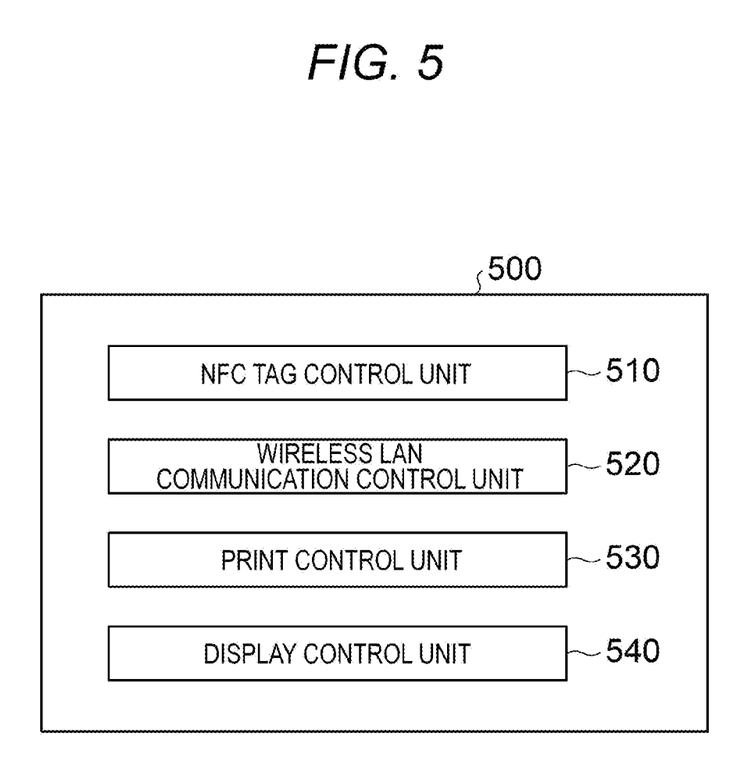
FIG. 5 is a diagram illustrating an exemplary functional block configuration of the printer.

FIG. 5 is a functional block diagram (500) of the printer 102. The printer 102 includes an NFC tag control unit 510, a wireless LAN communication control unit 520, a print control unit 530, and a display control unit 540. The NFC tag control unit 510 has a function of reading and writing the data in the internal memory of the NFC tag unit 308. The NFC tag control unit 510 also has a function of detecting establishment/disconnection of the NFC communication 103. The NFC tag control unit 510 further has a function of detecting reading and writing from an external reader writer through the NFC communication 103.

The wireless LAN communication control unit 520 is a processing unit that controls the wireless LAN communication via the wireless LAN communication unit 309. The wireless LAN communication control unit 520 has STA and AP functions. In a case where wireless LAN setting information for connecting to a wireless LAN is written in the internal memory of the NFC tag unit 308 from an external apparatus, the wireless LAN communication control unit 520 has a function of connecting to the wireless LAN based on the setting information.

The print control unit 530 is a processing unit that executes a printing request input from an external apparatus by controlling the print unit 310. The display control unit 540 processes an output to the display unit 301 and an input from the operation unit 302.

An operation of a communication system having the above configuration will be described below.

Figure 6:
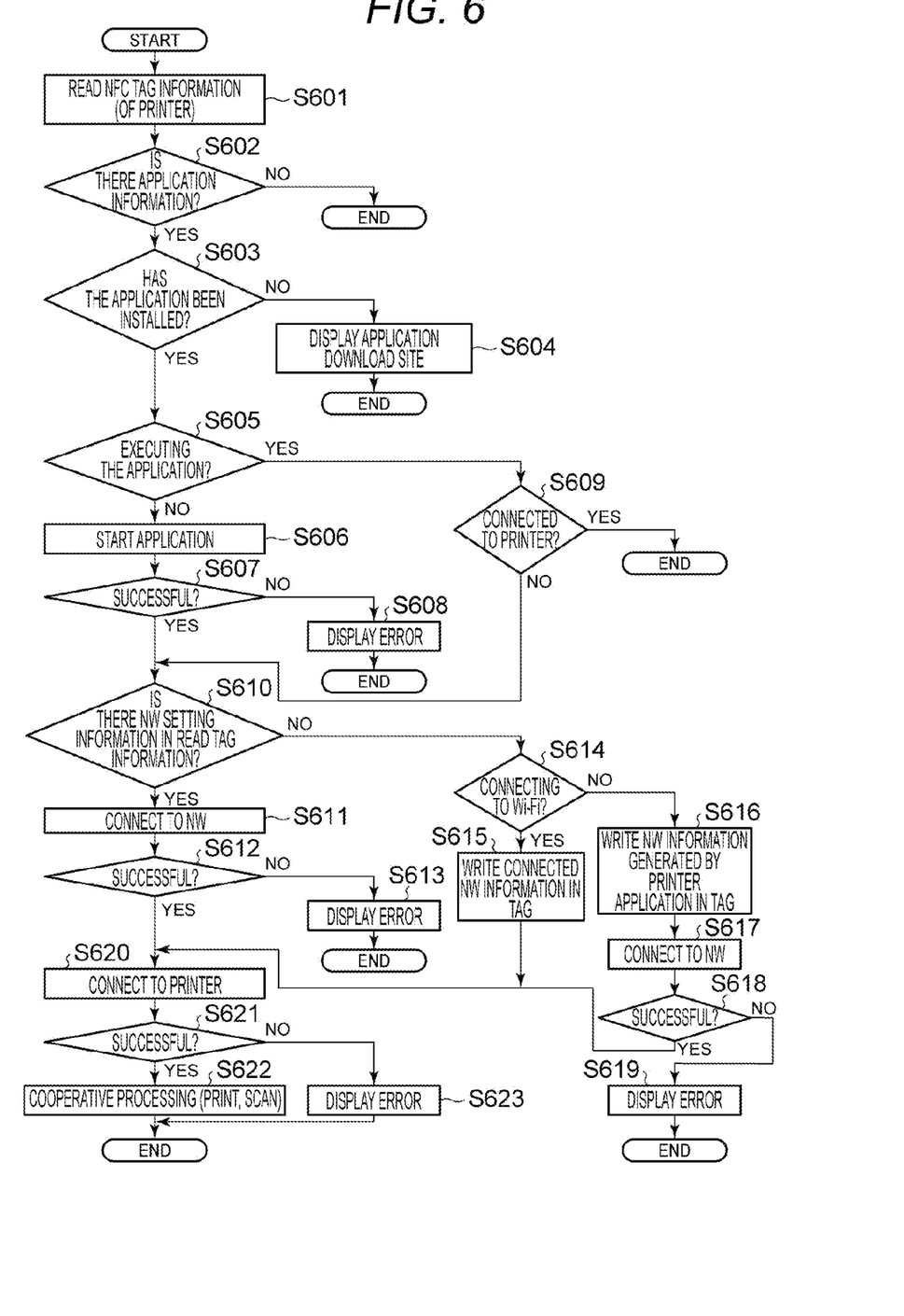
FIG. 6 is a flowchart illustrating an operation of the smartphone.

An operating procedure of the smartphone 101 according to the present embodiment will be described with reference to a flowchart of FIG. 6. The present flowchart starts when the NFC communication unit 208 of the smartphone 101 and the NFC tag unit 308 of the printer 102 are brought closer to each other and the NFC communication 103 is established. The flowchart illustrated in FIG. 6 is realized when the control unit 205 executes the control program stored in the ROM 206, calculates and processes information, and controls each hardware. A part or all of steps illustrated in the flowchart of FIG. 6 may be realized by hardware such as the ASIC.

First, the NFC communication control unit 410 of the smartphone 101 reads data written in the internal memory of the NFC tag unit 308 of the printer 102 (S601). Next, the application control unit 430 checks whether application information is included in the read data (S602). The application information is information including an identifier of the application which can be executed by the application control unit 430 of the smartphone 101. As described above, when the application information is read through the NFC communication 103, the smartphone 101 starts an application corresponding to the identifier or guides to a download site. That is, the smartphone 101 automatically starts, by receiving the application information from the printer 102, an application indicated by the application information. An application indicated by the application information, which the printer 102 can write in the internal memory of the NFC tag unit 308, is assumed to be the printer cooperative application 440. The printer cooperative application 440 is an application for selecting image data that have been stored in the smartphone 101, and transmitting and printing the selected image data to and by the printer 102.

If the application information is not included in the data read in S601 (NO in S602), the smartphone 101 finishes the processing. In this case, the smartphone 101 may display an error.

If the application information is included in the read data (YES in S602), the application control unit 430 checks whether an application to be identified by the application information has been installed in the storage unit 203 (S603). In an example indicated in this embodiment, an application identified by the application information is the printer cooperative application 440. If the printer cooperative application 440 has not been installed (NO in S603), the application control unit 430 displays a Web page, from which this application can be downloaded, in the display unit 201 (S604) and finishes this processing. The smartphone 101 may download and install the application after S604 in accordance with a user operation.

If the printer cooperative application 440 has been installed (YES in S603), the application control unit 430 checks whether the printer cooperative application 440 has already been started (S605). If the printer cooperative application 440 has not been started (NO in S605), the application control unit 430 tries to start the printer cooperative application 440 (S606). If the start fails (NO in S607), the application control unit 430 displays an error message in the display unit 201 (S608) and finishes this processing. If the start succeeds (YES in S607), the application control unit 430 transmits the data read in S601 to the printer cooperative application 440, which executes processing in and after S610.

If it is confirmed that the printer cooperative application 440 has been started as a result of the checking in S605 (YES in S605), it is checked whether the printer cooperative application 440 is connected to the printer 102 (S609). The connection with the printer 102 here means that the printer cooperative application 440 can execute, through the wireless LAN communication 104, cooperative processing with the printer 102, such as printing, scanning, and acquiring status. Specifically, a determination is made based on whether the printer 102 is discovered by a simple service discovery protocol (SSDP). The determination is also made by a condition such as that the connection with the printer 102 has been made by a transmission control protocol (TCP). That is, it is determined whether the smartphone 101 is connected to the printer 102, for example, through the wireless LAN communication 104 and in an IP layer.

If the printer cooperative application 440 is connected to the printer 102 (YES in S609), the processing finishes. After S609, the printer cooperative application 440 may execute, for example, processing for printing image data in response to a user instruction.

If the printer cooperative application 440 is not connected to the printer 102 (NO in S609), the printer cooperative application 440 executes processing in and after S610.

In S610, the printer cooperative application 440 checks whether the wireless LAN setting information is included in the tag information that has been read in S601 (S610). The wireless LAN setting information here includes various types of wireless communication parameters for wireless communication in conformity with the IEEE 802.11 standard. The wireless LAN setting information includes wireless communication parameters which are necessary for wireless LAN communication, such as a service set identifier (SSID) as a network identifier, an encryption scheme, an encryption key, an authentication scheme, and an authentication key. An IP address for communication in the IP layer, for example, may also be included.

If the wireless LAN setting information is included in the data read from the NFC tag unit 308, the printer cooperative application 440 tries to connect to the wireless LAN network indicated by the wireless LAN setting information (S611). If the connection to the wireless LAN network fails (NO in S612), an error message is displayed in the display unit 201 (S613) and this processing finishes. If the connection to the wireless LAN network succeeds (YES in S612), the printer cooperative application 440 connects to the printer 102 (S620). Specifically, the printer 102 is searched for by the SSDP via the wireless LAN communication control unit 420, and a connection with the printer 102 is made by the TCP.

If the connection with the printer 102 succeeds (YES in S621), the printer cooperative application 440 executes cooperative processing with the printer 102 (S622). The cooperative processing is, for example, processing where image data selected in the smartphone 101 are transmitted through the wireless LAN communication 104 to the printer 102, which prints the image data received from the smartphone 101. Another example of the cooperative processing is processing where data scanned by the printer 102 are transmitted through the wireless LAN communication 104 to the smartphone 101, which displays or stores the data received.

If the connection with the printer 102 fails (NO in S621), the printer cooperative application 440 displays an error message in the display unit 201, and finishes this processing. In this case, it may be acceptable to disconnect from the wireless LAN network that has been connected in S611.

If the wireless LAN setting information is not included in the tag information read in S601 (NO in S610), the printer cooperative application 440 checks whether the wireless LAN communication control unit 420 is connected to the wireless LAN network (S614). If connected to the wireless LAN network (YES in S614), the printer cooperative application 440 writes the setting information of the connected wireless LAN network in the NFC tag unit 308 of the printer 102 via the NFC communication control unit 410 (S615). In this way, the smartphone 101 connects the printer 102 to the wireless network by transmitting the setting information of the connected wireless LAN network to the printer 102.

From the start of the processing of FIG. 6 and before the execution of the processing in S615, the NFC communication unit 208 of the smartphone 101 and the NFC tag unit 308 of the printer 102 are assumed to be kept close to each other. That is, a series of processing of communication through the NFC communication 103 is executed without disconnection of the NFC communication 103. Therefore, the user can start an application necessary for communication between apparatuses and make communication settings by a simple operation that brings the apparatuses closer once. In a case where the smartphone 101 and the printer 102 are separated and the NFC communication cannot be performed at the time of executing the processing in S615, the smartphone 101 may display an error message in the display unit 201 and finish this processing (not illustrated). If the processing in S615 is executed, the printer cooperative application 440 executes the processing in and after S620 (described above).

On the other hand, if the wireless LAN communication control unit 420 is not connected to the network (NO in S614), the printer cooperative application 440 writes, in the NFC tag unit 308, the wireless LAN network setting information generated by the printer 102 (S616). The network setting information to be written here (such as SSID and an encryption pass key) is generated and managed by the smartphone 101. The wireless LAN setting information written in S616 may be set by the user in advance or stored as a fixed value by the printer cooperative application 440. The wireless LAN setting information written in S616 may also be randomly generated at the time of executing S616, or generated based on an identifier of the printer 102, included in the tag information that has been acquired in S601. In S616, the written wireless LAN setting information is written in the NFC tag unit 308 together with information (such as a flag) indicating that the written wireless LAN setting information is generated by a request to the printer 102. In S616, the wireless LAN setting information to be written may be information for setting a network which the smartphone 101 forms by using its own AP function.

From the start of the processing of FIG. 6 and before the execution of the processing in S616, the NFC communication unit 208 of the smartphone 101 and the NFC tag unit 308 of the printer 102 are assumed to be kept close to each other. That is, a series of processing of communication through the NFC communication 103 is executed without disconnection of the NFC communication 103. Therefore, the user can start the application necessary for communication between apparatuses and make communication settings by a simple operation that brings the apparatuses closer once. In a case where the smartphone 101 and the printer 102 are separated and the NFC communication cannot be performed at the time of executing the processing in S616, the smartphone 101 may display an error message in the display unit 201 and finish this processing (not illustrated).

When writing of the wireless LAN setting information in S616 is completed, the printer cooperative application 440 tries to connect to the wireless network based on the written wireless LAN setting information via the wireless LAN communication control unit 420 (S617). If the connection succeeds (YES in S618), the printer cooperative application 440 executes the processing in and after S620 (described above). If the connection fails (NO in S618), the printer cooperative application 440 displays an error message in the display unit 201 and finishes this processing.

In finishing this processing, the smartphone 101 may finish the printer cooperative application 440 which has been started in S606. When finishing this processing, the smartphone 101 may also be disconnected from the wireless LAN network, to which the smartphone 101 has been connected in S611 or S617. Furthermore, the smartphone 101 may be disconnected from the printer cooperative application 440 or the wireless LAN network when finishing this processing as an error (S613, S619, and S623).

Thus, the smartphone 101 can start the application necessary for communication between apparatuses and make communication settings by a simple operation that brings the apparatuses closer once.

Figure 7:
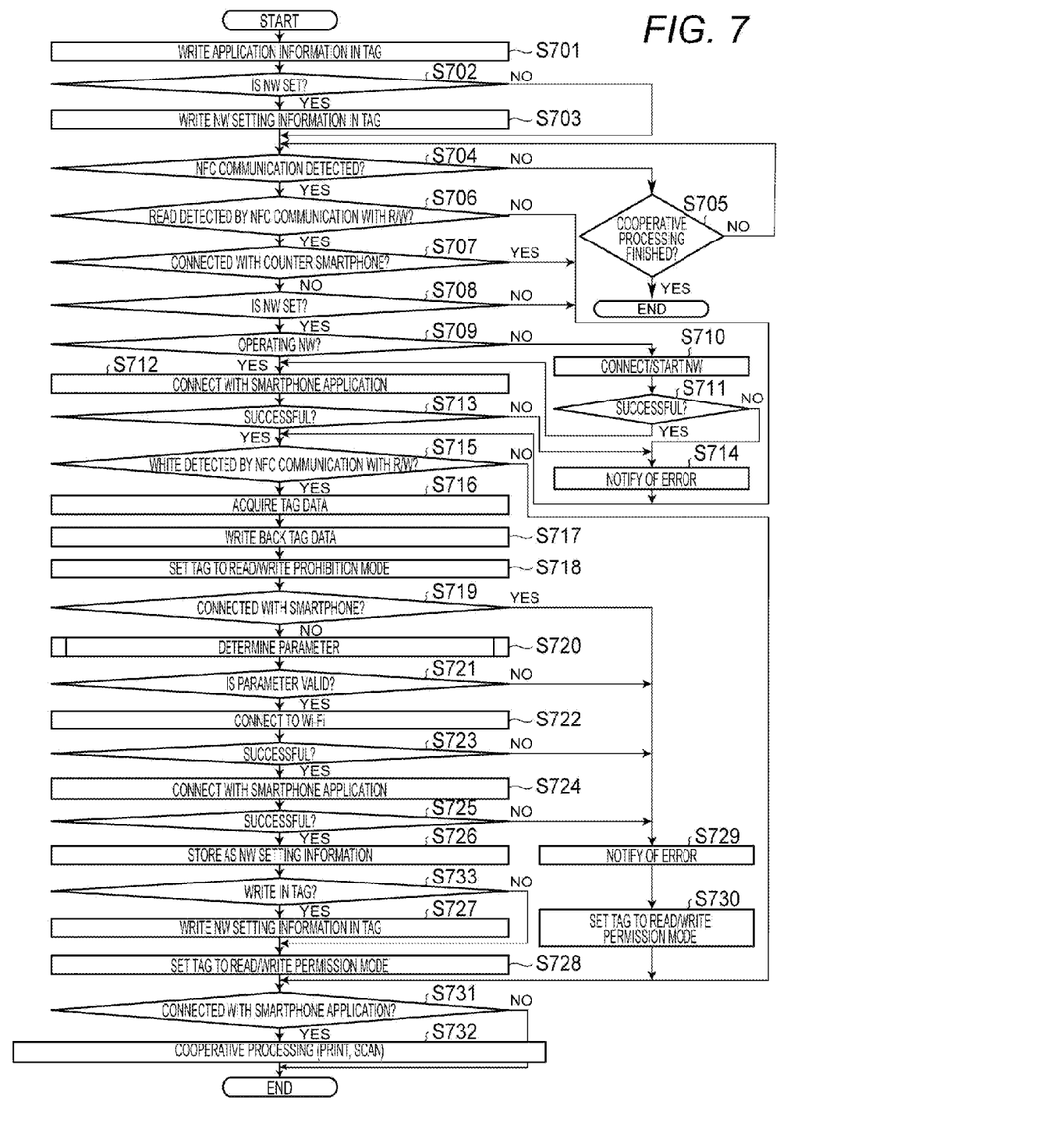
FIG. 7 is a flowchart illustrating an operation of the printer.
Figure 8:
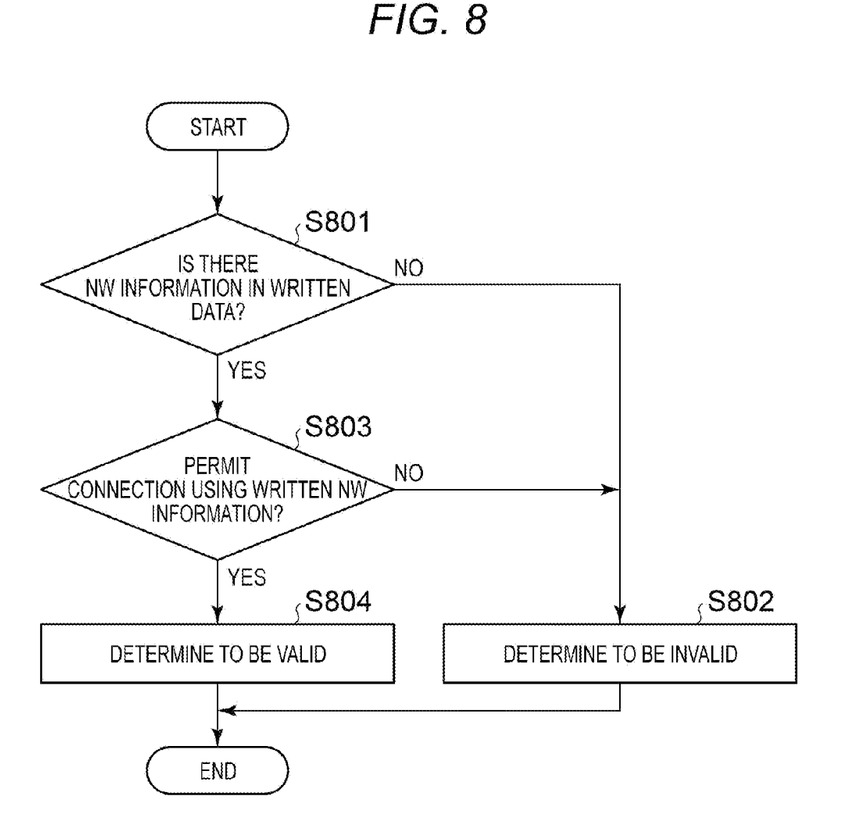
FIG. 8 is a flowchart illustrating determining processing of the printer.

Next, an operating procedure of the printer 102 according to the present embodiment will be described with reference to flowcharts of FIGS. 7 and 8. The flowcharts illustrated in FIGS. 7 and 8 are realized when the control unit 305 executes the control program stored in the ROM 306, calculates and processes information, and controls each hardware. A part or all of steps illustrated in the flowcharts of FIGS. 7 and 8 may be realized by hardware such as the ASIC.

The flowchart of FIG. 7 starts, for example, when power of the printer 102 is turned ON, when the user operates the operation unit 302 and selects a menu for starting cooperative processing with the smartphone, or when an operation for turning the NFC communication ON is accepted.

First, the NFC tag control unit 510 writes information on an application to be started by the smartphone 101 in the NFC tag unit 308 (S701). In the present embodiment, the application information to be written in S701 is information on the printer cooperative application 440. Next, the printer 102 checks whether the wireless LAN setting information to be written in the NFC tag unit 308 is stored in the storage unit 303 or the RAM 307 (S702). A determination in S702 is made based on whether the wireless LAN setting information the user should write in the NFC tag unit 308 has been set.

If the wireless LAN network information that should be written in the NFC tag unit 308 is stored (YES in S702), the NFC tag control unit 510 writes the wireless LAN network information together with the application information described above in the NFC tag unit 308 (S703). The wireless LAN setting information to be written in the NFC tag unit 308 may be information for connecting to a wireless network which is formed by the printer 102 as an access point. The printer 102 may switch contents of the wireless LAN network information to be written in the NFC tag unit 308 depending on a connection status of the network. For example, in a case where a connection is made to the network of an external access point via the wireless LAN communication unit 309, information on the network is assumed to be written. In another case, network information generated by the wireless LAN communication control unit 520 serving as an access point may be written.

Next, the printer 102 enters a state of waiting for the NFC tag control unit 510 to detect the NFC communication (S704 and S705). The printer 102 checks whether the NFC tag control unit 510 detects establishment of the NFC communication (S704) and whether an event that finishes the cooperative processing with the smartphone 101 is detected (S705). If the event finishing the cooperative processing with the smartphone 101 is detected (YES in S705), the printer 102 finishes this processing. Here, the event finishing the cooperative processing with the smartphone 101 is, for example, a power OFF operation of the printer 102, end processing by a user's operation of the operation unit 302, or reception of an end message from the smartphone 101 via the wireless LAN communication control unit 520.

If the establishment of the NFC communication is detected (YES in S704), the NFC tag control unit 510 checks whether the communication is a request from an NFC reader writer (smartphone 101) to read out data stored in the NFC tag unit 308 (S706). If there is a request for readout from the NFC reader writer (YES in S706), the printer 102 transmits the data stored in the NFC tag unit 308 and executes a series of processing corresponding to the request for readout (S707 to S714).

When receiving the readout request from the NFC reader writer, the printer 102 checks whether a connection has been made with a connecting partner apparatus (smartphone 101) of the NFC communication through the wireless LAN communication (S707). The determination is made based on identification information of the smartphone 101, included in the request for readout from the smartphone 101.

If not connected to the smartphone 101 that is the connecting partner of the NFC communication through the wireless LAN communication (NO in S707), the processing is switched based on whether the processing in S703 is executed. If the wireless LAN setting information is written in S703 (YES in S708), the printer 102 checks whether a connection is made to the network indicated by the wireless LAN setting information (S709).

The connection to the network here includes a status where the wireless LAN communication control unit 520 serves as an access point and generates the wireless LAN network. If not connected to the wireless LAN network (NO in S709), the wireless LAN communication control unit 520 tries to connect to or generate the network (S710). If the network connection/generation fails (NO in S711), the printer 102 displays an error message in the display unit 301 and notifies the user of the failure in network connection (S714). If the network connection/generation succeeds (YES in S711), the printer 102 tries to connect to the printer cooperative application 440 of the smartphone 101 (S712). Alternatively, if connected to the wireless LAN network in S709 (YES in S709), the printer 102 tries to connect to the printer cooperative application 440 of the smartphone 101 (S712). If the connection with the printer cooperative application 440 succeeds, the processing proceeds to S715. If the connection with the printer cooperative application 440 succeeds, the processing may proceed to S732 that will be described later.

If the connection with the printer cooperative application 440 fails (NO in S713), the printer 102 displays an error message in the display unit 301 and notifies the user of the failure in network connection (S714). If the user is notified of the failure in network connection, the processing proceeds to S715 that will be described later. If the user is notified of the failure in network connection, the processing may be finished.

In S715, the NFC tag control unit 510 checks whether there has been a write request from the NFC reader writer (smartphone 101) that is the connecting partner of the NFC communication (S715). If there has been a write request from the NFC reader writer (YES in S715), the printer 102 executes a series of processing corresponding to the write request (S716 to S730).

When the write request from the smartphone 101 is received, the NFC tag control unit 510 accepts data writing in the NFC tag unit 308 from the smartphone 101. The NFC tag control unit 510 acquires, in the RAM 307, data written in the NFC tag unit 308 (S716), and writes back data, which have been written in the NFC tag unit 308 before the writing, in the NFC tag unit 308 (S717). In addition, the NFC tag control unit 510 prohibits write and read access to the NFC tag unit 308 from an external apparatus (S718).

Next, the printer 102 checks whether a connection has been made through the wireless LAN communication with a smartphone different from the smartphone 101 that is the connecting partner of the NFC communication (S719). If connected to the other smartphone (YES in S719), the printer 102 displays an error message in the display unit 301 and notifies the user of a failure in network connection (S729). This is because the printer 102 executes the wireless LAN communication with a single communication partner. The printer 102 may be configured to execute the wireless LAN communication simultaneously with a plurality of smartphones. In this case, the processing in S719 and S729 is not executed, but the processing in S720 is executed.

If the error message is displayed in S729, the NFC tag control unit 510 permits write and read access to the NFC tag unit 308 from an external apparatus (S730) and the processing proceeds to S731.

On the other hand, if a connection has not been made with the other smartphone in S719 (NO in S719), the printer 102 determines validity of the wireless LAN setting information based on the data acquired in S716 (S720).

Validity determining processing for the wireless LAN setting information will be described using the flowchart of FIG. 8. First, the printer 102 checks whether the wireless LAN setting information is included in the data acquired from the NFC tag unit 308. If the wireless LAN setting information is not included, the printer 102 determines the written wireless LAN setting information to be invalid (S802).

If the wireless LAN setting information is included, the printer 102 determines whether a connection using the wireless LAN setting information written in the NFC tag unit 308 is permitted (S803). The determination in S803 is made by confirming whether the user sets to permit the connection using the wireless LAN setting information. Default settings are assumed to permit the connection using the wireless LAN setting information written in the NFC tag unit 308. The determination in S803 may be made based on a security level of the wireless LAN setting information written in the NFC tag unit 308. For example, a connection may be permitted only with a wireless LAN network classified by a specific type of encryption or authentication such as advanced encryption standard (AES). In a case where the wireless LAN network is classified by encryption or by an authentication method, of which security level is low, such as wired equivalent privacy (WEP), it may be determined that the connection using this wireless LAN setting information should not be permitted. If it is determined that the connection has been permitted in S803, the wireless LAN setting information written in the NFC tag unit 308 is determined to be valid (S804).

Referring back to the description of FIG. 7, if, as a result of the determination in S720, the wireless LAN setting information is determined to be invalid (NO in S721), the printer 102 displays an error message in the display unit 301 (S729), and permits write and read access to the NFC tag unit 308 (S730). If, as a result of the determination in S720, the wireless LAN setting information is determined to be valid (YES in S721), the wireless LAN communication control unit 520 tries to connect to a network based on the wireless LAN setting information acquired in S720 (S722). If the connection fails (NO in S723), the printer 102 displays an error message in the display unit 301 (S729) and permits write and read access to the NFC tag unit 308 (S730).

If a connection to a connectable wireless network based on the written wireless LAN setting information succeeds (YES in S723), the printer 102 tries to connect to the printer cooperative application 440 of the smartphone 101 (S724). In S724, the printer 102 searches for the smartphone 101 that has started the printer cooperative application 440 by the SSDP and establishes a connection with the smartphone 101 searched for, by the TCP.

If the connection with the printer cooperative application 440 fails (NO in S725), the printer 102 displays an error message in the display unit 301 (S729) and permits write and read access to the NFC tag unit 308 (S730). If the connection succeeds (YES in S725), the printer 102 stores the setting information of the connected wireless LAN network in the storage unit 303 or the RAM 307 (S726).

Next, the NFC tag control unit 510 determines whether the wireless LAN setting information written from the smartphone 101 is to be put into a state stored in the NFC tag unit 308 (S733). The determination in S733 is made based on a setting accepted from the user. In a case where the wireless LAN setting information written based on the setting accepted from the user is to be put in the state stored in the NFC tag unit 308, the printer 102 writes the wireless LAN setting information in the NFC tag unit 308 (S727). Then, the NFC tag control unit 510 permits write and read access to the NFC tag unit 308 (S728).

After a series of processing from S706 to S730 is finished, the printer 102 checks whether a connection has been made with the printer cooperative application 440 of the smartphone 101 (S731). If the connection has been made with the printer cooperative application 440 (YES in S731), the printer 102 executes cooperative processing with the smartphone 101 (S732). The cooperative processing is, for example, processing where image data selected in the smartphone 101 are transmitted through the wireless LAN communication 104 to the printer 102, which prints the image data received from the smartphone 101. Another example of the cooperative processing is processing where data scanned by the printer 102 are transmitted through the wireless LAN communication 104 to the smartphone 101, which displays or stores the data received.

Thus, the printer 102 can start the application of the smartphone 101, required for communication between apparatuses and make communication settings by a simple operation that brings the apparatuses closer once.

Figure 9:
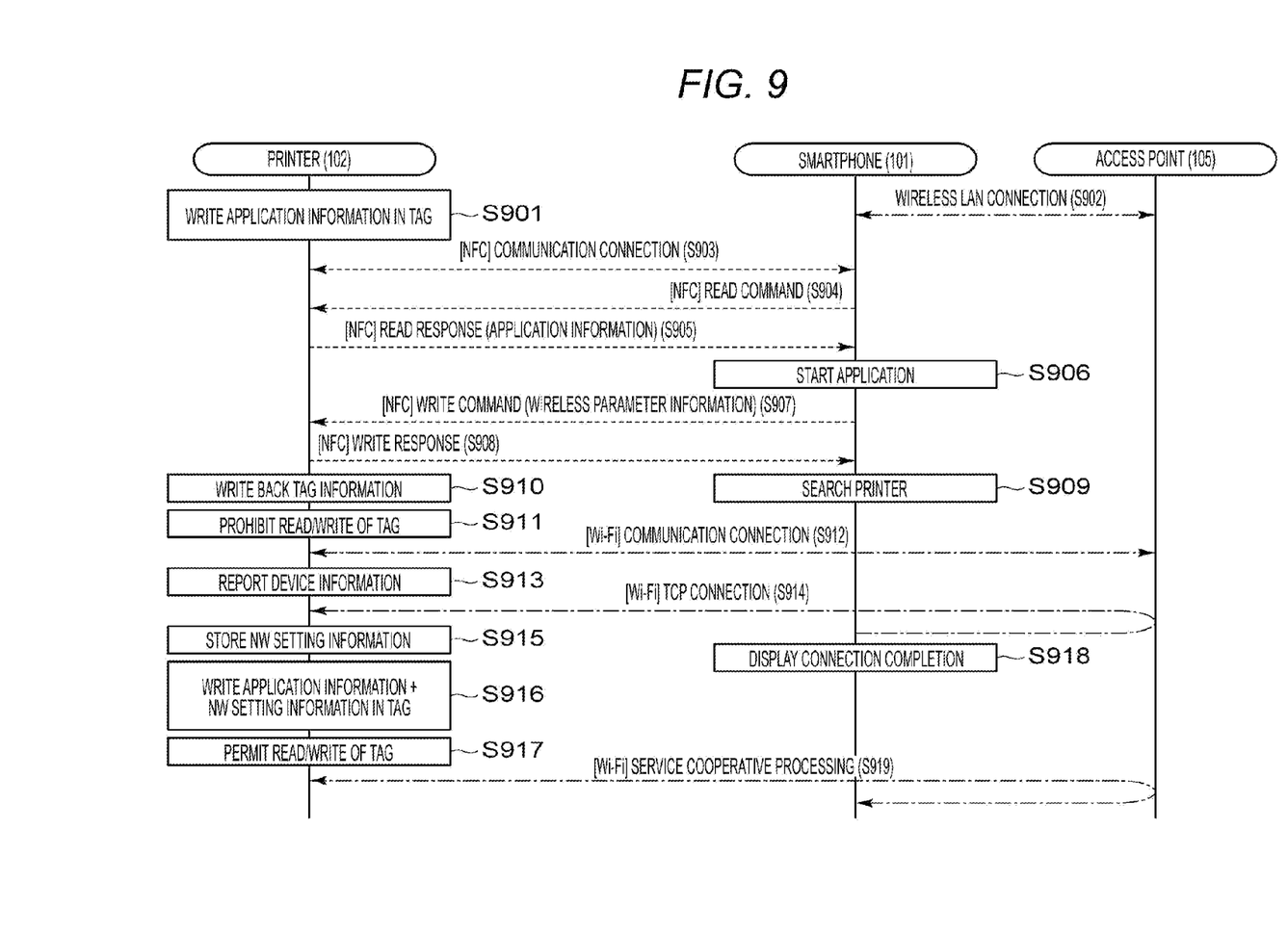
FIG. 9 is a diagram illustrating a communication sequence between the printer and the smartphone.

Next, an example of communication sequence between the smartphone 101 and the printer 102 will be described in detail with reference to FIG. 9. As a prerequisite, the printer 102 is configured to exclude a wireless LAN network, and assumed not to retain the wireless LAN setting information. The smartphone 101 is assumed to be connected to an access point 105.

First, when the user operates the printer 102 and starts the cooperative processing with the smartphone, the printer 102 writes application information, which is a subject of cooperation, in the NFC tag unit 308 (S901). On the other hand, the smartphone 101 is connected to a wireless LAN network managed by the access point 105 (S902). In this condition, when the printer 102 and the smartphone 101 are brought closer by the user within an area communicable through the NFC communication 103, the NFC communication 103 is established between the printer 102 and the smartphone 101 (S903).

When detecting the NFC tag unit 308, the smartphone 101 transmits to the printer 102 a Read command for reading the internal memory of the NFC tag unit 308 (S904). The NFC tag unit 308 of the printer 102 returns to the smartphone 101 a Read response including the application information written in S901 (S905). The application control unit 430 of the smartphone 101 starts an application (printer cooperative application 440) corresponding to the application information received in S905 (S906).

Next, the wireless LAN setting information is not included in the read NFC tag unit 308. Therefore, in order to execute the cooperative processing with the printer 102, the smartphone 101 sets a wireless LAN network for the printer 102. The printer cooperative application 440 transmits to the printer 102 a Write command for writing, in the NFC tag unit 308, the wireless LAN setting information of the access point 105 connected in S902 (S907). The NFC tag unit 308 of the printer 102 returns to the smartphone 101 a Write response message indicating a normal completion of the writing (S908). The processing from S903 to S908 is executed while the printer 102 and the smartphone 101 are kept closer as in S903 by the user within the area communicable through the NFC communication 103. The smartphone 101 that has received the Write response message in S908 starts searching for the printer 102 on the wireless LAN network managed by the access point 105 (S909). Here, searching is to search for a device using the SSDP protocol, for example.

The printer 102 that has received a Write command of the NFC writes data before accepting the Write command in the NFC tag unit 308 (data written in S901) (S910). The printer 102 also prohibits read and write in the NFC tag unit 308 from an external device (S911). Next, the printer 102 connects to the wireless LAN network written in S907 (i.e., the wireless LAN network of the access point 105) by using the wireless LAN communication control unit 520 (S912). When the connection to the wireless LAN is completed, the printer reports its own information on the wireless LAN network (S913). The smartphone 101 detects, in the search that has started in S909, the device information reported by the printer 102 in S913 and connects to the device (i.e., printer 102) by the TCP (S914).

When the connection with the smartphone 101 by the TCP is completed, the printer 102 stores the wireless LAN setting information of the access point 105 in the storage unit 303 or the RAM 307 (S915). Thus, bringing the printer 102, which is, for example, in an initial state where a setting for wireless communication has not been made, closer to the smartphone 101, in which the setting has been made, can easily make the wireless setting for the printer 102 and achieve the cooperative processing.

The printer 102 also writes in the NFC tag unit 308 application information, which is a subject for cooperation, and the wireless LAN setting information of the access point 105 (S916). Thus, when confirming validity of the wireless LAN setting information written from the smartphone 101, the printer 102 can write the wireless LAN setting information in the NFC tag unit 308. Therefore, after this, by bringing another smartphone, in which the wireless setting has not been made, closer to the printer 102, the printer 102 can make the wireless setting for the other smartphone and achieve the cooperative processing.

After writing the wireless LAN setting information in the NFC tag unit 308, the printer 102 permits reading from and writing into the NFC tag unit 308 from an external device (S917). When the TCP connection succeeds in S914, the smartphone 101 displays a message indicating completion of the connection with the printer 102 in the display unit 201 (S918). Then, between the smartphone 101 and the printer 102, the cooperative processing such as printing and scanning is executed using the wireless LAN communication via the access point 105 (S919).

As described above, according to the present embodiment, an operation that brings devices closer has enabled both handover from the NFC to the wireless LAN, for example and start of a smartphone application (or guidance to a download site), and improved the operability. Whether or not the printer retains the wireless LAN network setting information, an operation that brings devices closer once has enabled the handover and the start of the smartphone application and improved the operability.

In the smartphone, when the wireless LAN is not connected, by notifying of the wireless LAN setting information generated by the printer through the NFC, the operation that brings devices closer once has enabled a direct connection between the devices and improved the operability and the connectivity.

In the printer, in confirming the validity of the wireless LAN network information written in the NFC tag, it is prohibited to read from and write in the NFC after writing back the NFC tag to data before the writing. As a result, when another smartphone is brought closer during the handover to the wireless LAN, or the like, unnecessary memory update of the NFC tag can be prevented in the printer, and in the smartphone that has been brought closer later, the connection can be detected as an error.

The above embodiment is only an example. The present embodiment is not limited to the embodiment indicated in the specification and drawings, and can be changed and executed without departing from the spirit.

In the above embodiment, the wireless communication method, by which the handover is executed from the NFC, has been described only for the wireless LAN, but the present embodiment is not limited thereto and the handover to communication through Bluetooth®, for example, may be executed.

In the above embodiment, a method has been exemplified, where the wireless LAN communication is executed by using an external access point or by making a printer serve as an access point. However, the present embodiment is not limited to this, and for example, a smartphone may serve as an access point. The wireless LAN communication may also be executed in accordance with a connection procedure by Wi-Fi Direct between communication apparatuses.

In the above embodiment, it is assumed to display an error message in the display unit 201 or 301 for notifying the user of a processing error, but the method for notifying the user of the error is not limited thereto. It is possible to notify of the error by, for example, sound, vibration, or lighting/blinking of an LED.

In the above embodiment, it is assumed that touching the other smartphone during processing is determined as a write error by prohibiting reading from and writing into the NFC tag when the wireless LAN network information is written in the NFC tag of the printer. However, the present embodiment is not limited to this. For example, the other smartphone may be notified of an error message through the NFC, or writing data in the NFC tag may be determined as an error. In a case where a plurality of smartphones is touched during handover, the cooperative processing with all of the touched smartphones may be determined as an error. In addition, only writing in the NFC tag may be prohibited.

In the above embodiment, it is assumed that a message for confirming updating of the wireless LAN setting information of the printer is displayed in the display unit 301 of the printer 102 (S802). However, the present embodiment is not limited to this, and the message may be displayed in the display unit of the smartphone 101.

Other Embodiments

Aspects of the present invention can also be realized by processing where a program that realizes one or more functions of the above embodiment is supplied to a system or an apparatus through a network or a storage medium, and one or more processors in a computer of the system or the apparatus read out and execute the program. Aspects of the present invention can also be realized by a circuit that realizes one or more functions (such as an ASIC).

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-246352, filed Dec. 4, 2014, which is hereby incorporated by reference herein in its entirety.

What is claimed is:

1. A communication apparatus comprising:
    a first wireless communication unit configured to receive information stored in a memory of a communication partner apparatus by a first wireless communication method that is short range wireless communication;
    a second wireless communication unit configured to communicate with the communication partner apparatus by a second wireless communication method different from the first wireless communication method;
    a starting unit configured to start, in a case where application information is included in the information received through the first wireless communication unit, an application indicated by the application information; and
    a write unit configured to write, in a case where first setting information for connecting to a first wireless network by the second wireless communication method is not included in the information received through the first wireless communication unit, second setting information for connecting to a second wireless network by the second wireless communication method in the memory of the communication partner apparatus through the first wireless communication unit,
    wherein in a case where the first setting information is included in the information received through the first wireless communication unit, the second wireless communication unit connects to the first wireless network based on the first setting information, and
    wherein the application started by the starting unit is executed using communication through the second wireless communication unit based on the second setting information written by the write unit, or communication through the second wireless communication unit based on the first setting information.

2. The communication apparatus according to claim 1, wherein the write unit writes setting information of the second wireless network connected through the second wireless communication unit.

3. The communication apparatus according to claim 1, wherein the write unit notifies the communication partner apparatus of setting information on a network of the second wireless communication method.

4. The communication apparatus according to claim 1,
    wherein, in a case where the first setting information is included in the information received through the first wireless communication unit, the write unit does not write the second setting information in the memory of the communication partner apparatus, and
    wherein the application started by the starting unit is executed using the communication partner apparatus in a wireless network connectable based on the first setting information included in the information and communication through the second wireless communication unit.

5. The communication apparatus according to claim 1, wherein the first wireless communication unit communicates through near field communication.

6. The communication apparatus according to claim 1, wherein the second wireless communication unit communicates through wireless communication in conformity with an IEEE 802.11 series.

7. The communication apparatus according to claim 1, wherein the application started by the starting unit is an application for printing, and
    wherein the application causes, by transmitting image data retained by the communication apparatus to the communication partner apparatus through the second wireless communication unit, the communication partner apparatus to print the image data.

8. A method for controlling a communication apparatus including a first communication unit and a second communication unit, the method comprising:
    receiving information stored in a memory of a communication partner apparatus by a first wireless communication method which is short range wireless communication; and
    communicating with the communication partner apparatus by a second wireless communication method different from the first wireless communication method, wherein the second wireless communication method includes:

starting, in a case where application information is included in the information received through the first wireless communication unit, an application indicated by the application information, and writing, in a case where first setting information for connecting to a first wireless network by the second wireless communication method is not included in the information received through the first wireless communication unit, second setting information for connecting to a second wireless network by the second wireless communication method in the memory of the communication partner apparatus through the first wireless communication unit, wherein in a case where the first setting information is included in the information received through the first wireless communication unit, the second wireless communication unit connects to the first wireless network based on the first setting information, and wherein the started application is executed using communication through the second wireless communication unit based on the written second setting information or communication through the second wireless communication unit based on the first setting information.

9. A non-transitory computer-readable storage medium storing computer executable instructions for causing a communication apparatus including a first communication unit and a second communication unit to execute a method, the method comprising:

receiving information stored in a memory of a communication partner apparatus by a first wireless communication method which is short range wireless communication;

and communicating with the communication partner apparatus by a second wireless communication method different from the first wireless communication method, wherein the second wireless communication method includes:

starting, in a case where application information is included in the information received by the first wireless communication unit, an application indicated by the application; and writing, in a case where first setting information for connecting to a first wireless network by the second wireless communication method is not included in the information received through the first wireless communication unit, second setting information for connecting to a second wireless network by the second wireless communication method in the memory of the communication partner apparatus through the first wireless communication unit, wherein in a case where the first setting information is included in the information received through the first wireless communication unit, the second wireless communication unit to connect to a first wireless network based on the first setting information, and wherein the started application is executed using communication through the second wireless communication unit based on the written second setting information or communication through the second wireless communication unit based on the first setting information.

* * * * *